United States Patent [19]
Casal

[11] Patent Number: 5,903,747
[45] Date of Patent: May 11, 1999

[54] MICROPROCESSOR CLOCKING CONTROL SYSTEM

[75] Inventor: Humberto Felipe Casal, Austin, Tex.

[73] Assignee: International Business Machines Corporation, Armonk, N.Y.

[21] Appl. No.: 08/811,460

[22] Filed: Mar. 3, 1997

[51] Int. Cl.[6] .................................................. G06F 1/06
[52] U.S. Cl. ............................................................ 395/556
[58] Field of Search .................................... 395/556, 559, 395/551

[56] References Cited

U.S. PATENT DOCUMENTS

| | | | |
|---|---|---|---|
| 4,321,687 | 3/1982 | Parsons et al. | 395/556 |
| 4,534,011 | 8/1985 | Andrews et al. | 395/878 |
| 5,268,656 | 12/1993 | Muscavage . | |
| 5,373,535 | 12/1994 | Ellis et al. . | |
| 5,444,405 | 8/1995 | Truong et al. . | |
| 5,446,867 | 8/1995 | Young et al. . | |
| 5,560,000 | 9/1996 | Vogley | 395/556 |

*Primary Examiner*—Thomas M. Heckler
*Attorney, Agent, or Firm*—Anthony V. S. England; Jack V. Musgrove; Andrew J. Dillon

[57] ABSTRACT

A computer system is provided with microprocessor clocking control by providing a clock having output timing signals which vary based on input signals to the clock, setting timing parameters for the clock using a service processor which sends the input signals to the clock, and controlling the primary processor using the output timing signals from the clock. The service processor can be used to modify a pulse width of at least one of the output timing signals, and to delaying a first one of the output timing signals with respect to a second one of the output timing signals. Separate clock signals can be provided for the primary processor and other system components, such as a cache connected to the primary processor, a memory device of the computer system, or an input/output device of the computer system. The clock has a programmable duty-cycle control circuit. The duty-cycle control circuit may use delay chains having a plurality of individually selectable delay elements.

19 Claims, 7 Drawing Sheets

Clock Chip System Connectivity

Clock Chip System Connectivity

Fig. 4  P2SC CLOCK CHIP FUNCTIONAL DETAIL

MICROPROCESSOR CLOCKING CONTROL SYSTEM

BACKGROUND OF THE INVENTION

1. Field of the Invention

The present invention generally relates to computer systems and, more particularly, to clocking circuitry used to control the timing of computer components, such as processors, input/output devices, and memory.

2. Description of the Prior Art

The basic structure of a conventional computer system 10 is shown in FIG. 1. The heart of computer system 10 is a central processing unit (CPU) or processor 12 which is connected to several peripheral devices, including input/output (I/O) devices 14 (such as a display monitor and keyboard) for the user interface, a permanent memory device 16 (such as a hard disk or floppy diskette) for storing the computer's operating system and user programs, and a temporary memory device 18 (such as random-access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video-display monitor. Various types of device drivers (software programs) are used to control the hardware devices. Computer system 10 also includes firmware 24, whose primary purpose is to seek out and load an operating system from one of the peripherals (usually permanent memory device 16) whenever the computer is first turned on.

Conventional microprocessor systems have dramatically grown in complexity and capability to be the equivalent of the mainframe computer of yesterday. The clocking system has grown in complexity to match the function and high performance now provided by CMOS technology. The clocking system provides a multiplicity of timing signals to the CPU and associated elements such as memory and I/O devices. The clocks define the timing cycle of the data flow of the machine. Some clocks are non-overlapping and serve to isolate one cycle of operation from the next. Some clocks overlap so as to gain a performance advantage by stealing time from the next cycle. The positioning in time of these clocks is very critical for high performance, particularly for superscalar computers that issue multiple instructions simultaneously. For example, many processors have execution units which are "pipelined," or divided into separate stages, such that a single execution unit can actually be performing multiple tasks for different instructions during a single clock cycle, but this requires precise timing. Memory performance considerations (caching, snooping, etc.) also require fairly exact timing signals.

If clock circuitry, which provides the timing signals for a computer, has a latent defect, it can be difficult to detect. Conventional computers do not have the ability to adjust the timing of these clocks for testing the microprocessor system. This ability is essential to achieving high-performance system designs. It would, therefore, be desirable and advantageous to devise a method of adjusting timing margins and eliminating failing conditions should the clock circuity contain a timing defect.

SUMMARY OF THE INVENTION

It is therefore one object of the present invention to provide improved clock control for a computer system.

It is another object of the present invention to provide clock control that facilitates testing of the computer system by adjusting timing margins in the clock circuitry.

It is yet another object of the present invention to provide such clock control that can be used for factory testing as well as by an end user of the microprocessor system as part of a diagnostic package.

The foregoing objects are achieved in a method of adjusting the timing of a computer system, generally comprising the steps of providing a clock having output timing signals which vary based on input signals to the clock, setting timing parameters for the clock using a first (service) processor which sends the input signals to the clock and controlling a second (primary) processor using the output timing signals from the clock. The service processor can be used to modify a pulse width of at least one of the output timing signals and to delay a first one of the output timing signals with respect to a second one of the output timing signals. Separate clock signals can be provided for the primary processor and other system components, such as a cache connected to the primary processor, a memory device of the computer system, or an input/output device of the computer system. The clock has a programmable duty-cycle control circuit. The duty-cycle control circuit includes means for modifying a pulse width of at least one of the output timing signals and for delaying a first one of the output timing signals with respect to a second one of the output timing signals. The duty-cycle control circuit may use delay chains having a plurality of individually selectable delay elements.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
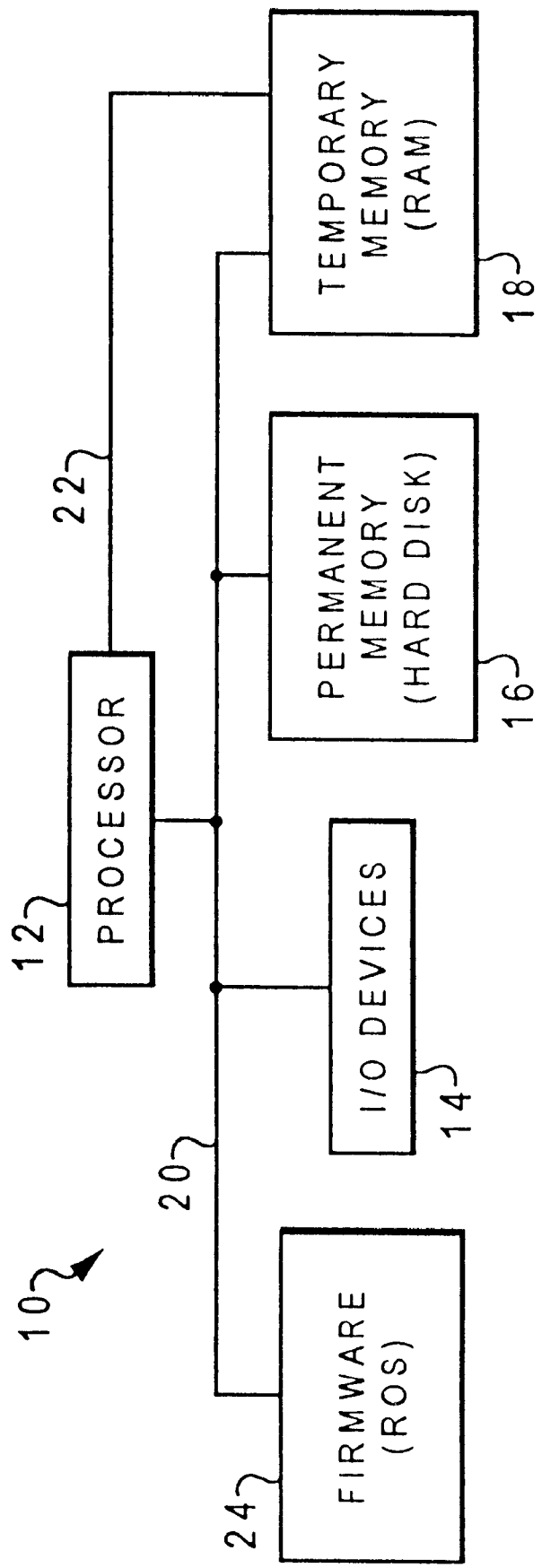
FIG. 1 is a block diagram of a prior-art computer system.
Figure 2:
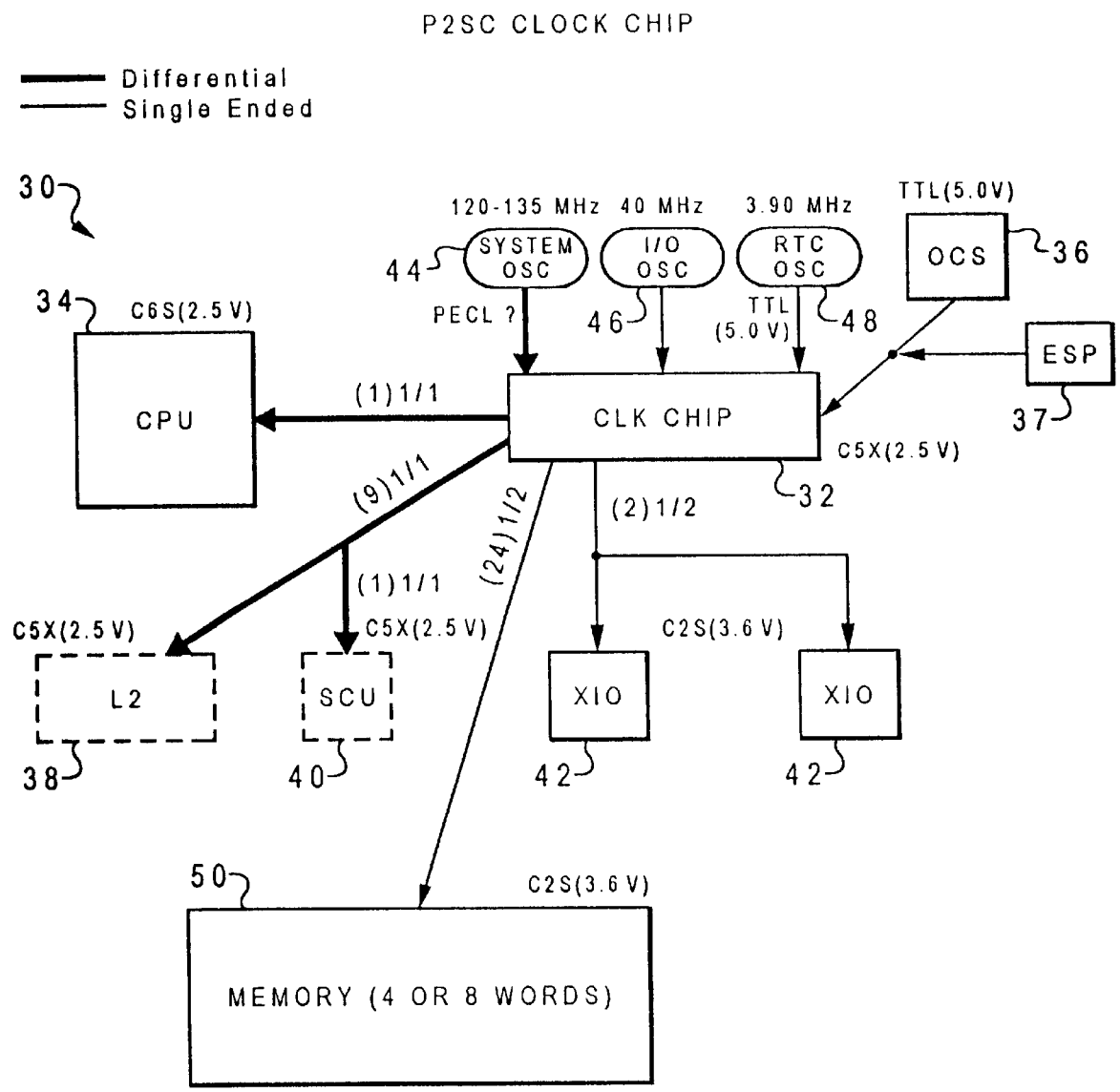
FIG. 2 is a block diagram depicting one embodiment of the clock system of the present invention.

With reference now to the figures, and in particular with reference to FIG. 2, there is depicted one embodiment of the computer clock system 30 of the present invention. Clock system 30 is generally comprised of a clock chip 32, a primary processor 34, and a secondary or service processor located in an on-chip (on-board) sequencer (OCS) 36. OCS 36 also provides firmware functionality, although an engineering support processor (ESP) 37 can be used in place of OCS 36 (the ESP is generally used only for testing, to issue commands and allow observation of internal states of registers). Clock chip 32 manages or controls primary processor 34. Clock chip 32 can also provide timing signals for other components of the computer system, such as an L2 cache 38, a storage control unit (SCU) 40, one or more extended input/output devices (XIOs) 42, and a memory device 50.

The primary inputs to clock chip 32 include a system oscillator 44 (running at an exemplary speed of 120–135 MHz), an input/output (I/O) oscillator 46 (running at an exemplary speed of 40 MHz), and a real-time clock (RTC) oscillator 48 (running at an exemplary speed of 3.9 MHz). While clock chip 32 is depicted as a physically separate component from processors 34 and 36, it is understood that these components, and others, could be integrated in various manners, so this depiction should not be construed in a limiting sense. The service processor in OCS 36 provides operational parameters that are loaded into clock chip 32, such as pulse widths and pulse skews, as explained further below.

Figure 3:
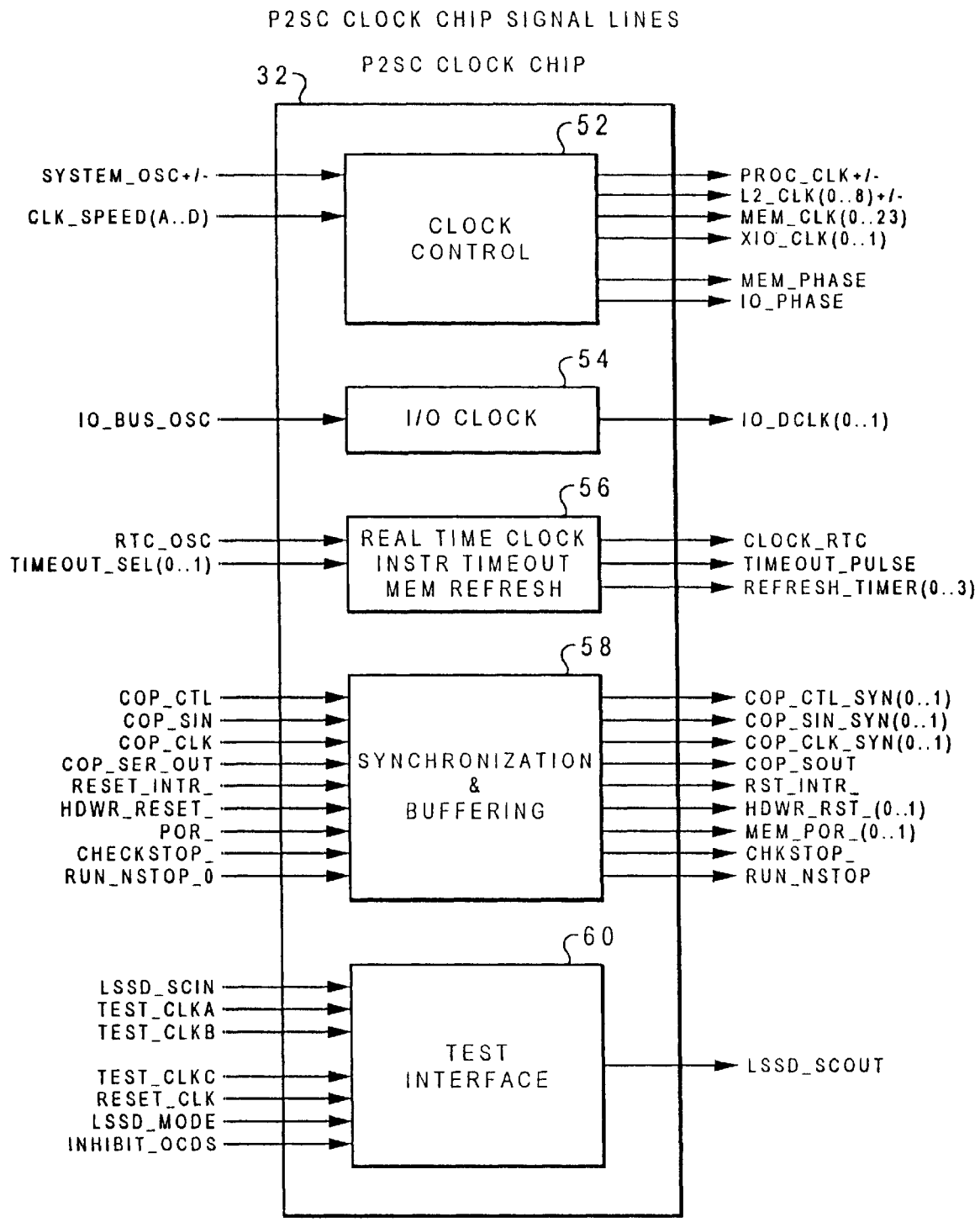
FIG. 3 is a high-level block diagram showing major elements of one embodiment of a clock chip used in the system of FIG. 2.

The major elements of clock chip 32 are shown in the high level block diagram of FIG. 3. Clock chip 32 has several functional blocks or circuits, including a clock control circuit 52, an I/O clock circuit 54, a timeout circuit 56, a synchronization circuit 58 and a test interface circuit 60. Clock control circuit 52 generates the basic clock signals, and has the ability to adjust relative clock edges (skew) as well as duty cycles. It has two inputs, one from system oscillator 44 ("system_osc") which provides a base clock signal, and another from primary processor 34 ("clk_speed"), which is used for dividing the base clock signal. The outputs of clock control circuit 52 include a first clock signal ("proc_clk") for controlling primary processor 34, a second clock signal ("l2_clk") for controlling L2 cache 38, a third clock signal ("mem_clk") for controlling system memory 50, and a fourth clock signal ("xio_clk") for controlling the XIOs 42. Two other output signals ("mem_phase" and "io_phase") are used to synchronize other signals (informing processor 34 of the states of the memory and I/O clocks). I/O clock circuit 54 has only one input ("io_bus_osc"), from I/O oscillator 46, and one output ("io_dclk") for synchronizing I/O devices with bus commands.

Timeout circuit 56 has two inputs, one ("rtc_osc") from RTC oscillator 48 to provide a real-time clock, and another ("timeout_sel") which is used in watchdog operations. The outputs of timeout circuit 56 include a clock signal ("clock_rtc") based on the "rtc_osc" signal, a timeout signal ("timeout_pulse") indicating a timeout state, and a signal ("refresh_timer") used to refresh system memory 50, e.g., DRAM.

Synchronization circuit 58 includes a buffer for repowering various signals. In this embodiment, nine different inputs are provided to synchronization circuit 58, including a control signal ("cop_ctl") from OCS 36 to indicate whether information being transmitted is data or instructions, a serial data input signal ("cop_sin") from OCS 36, a slower clock signal (""cop_clk") from OCS 36 used in loading the various registers of the system, a wrap back signal ("cop_ser_out") indicating the drive capability of CPU 34, a signal from OCS 36 used to reset interrupt states ("reset_intr_"), another signal from OCS 36 for initializing clock chip 32 to a reset state ("hdwr_reset_"), a power-on reset signal ("por_"), a signal from CPU 34 used to check on deadlock conditions ("checkstop_"), and an override signal ("run_nstop_O") from OCS 36 which forces the system to run regardless of the state of the "checkstop_" signal. Each of these inputs has a corresponding output.

Test interface circuit 60 is used only when testing the clock chip during manufacturing, such as by using scan designs including IBM's Level Sensitive Scan Design (LSSD), and has only one output ("lssd_scout"). It has several inputs, including a signal ("lssd_scin") for serial data in, two test clock signals ("test_clka" and "test_clkb") acting as shift clocks for the latches in clock chip 32, a third test clock signal ("test_clkc") which controls the output of the latches being tested, a signal used to reset the system before testing ("reset_clk"), a signal for enabling the test (scan) mode ("lssd-mode"), and a signal ("inhibit_ocds") for disabling all chip outputs.

Figure 4:
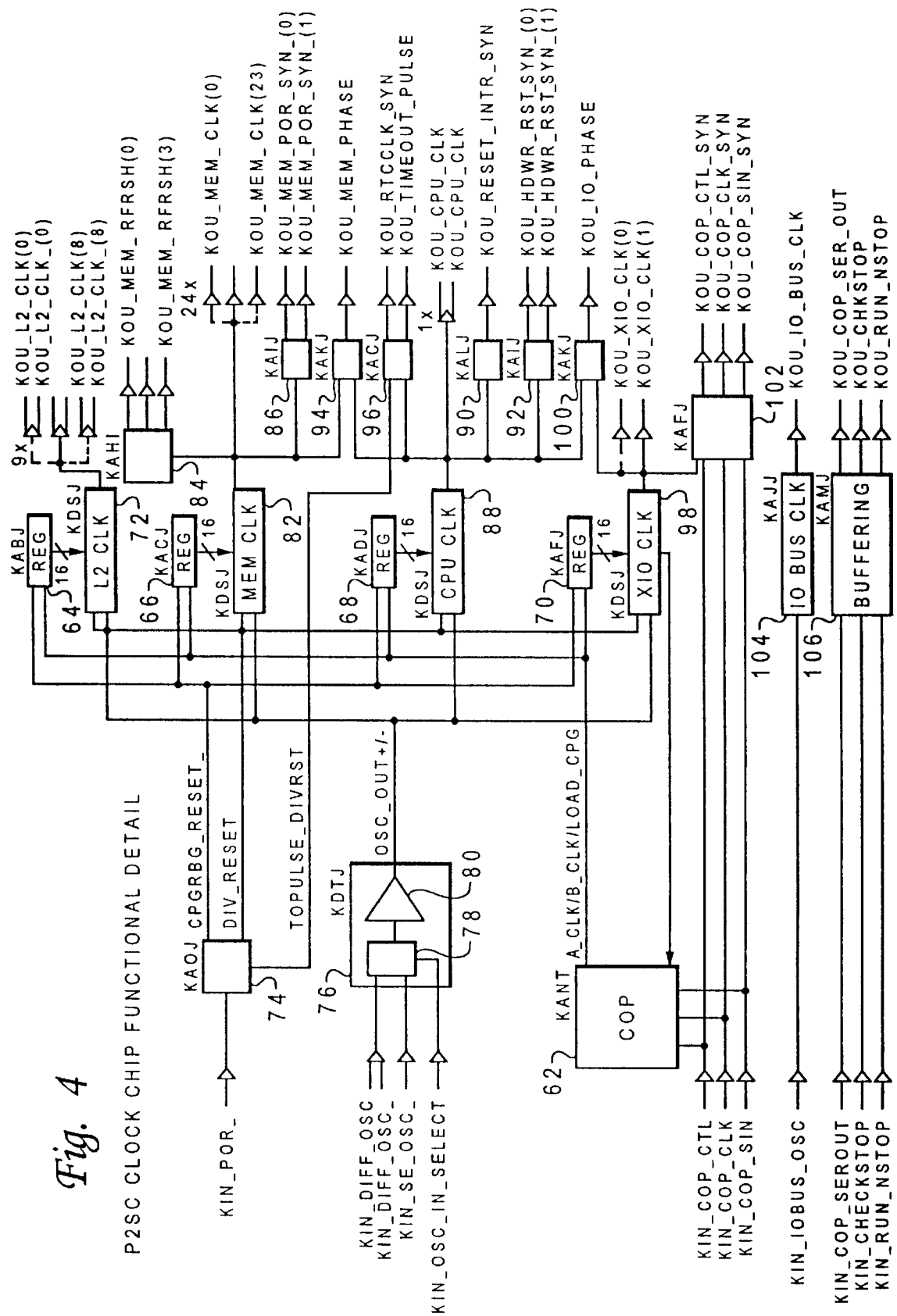
FIG. 4 is a more detailed block diagram of the clock chip of FIG. 2.

FIG. 4 is a more detailed view of clock chip 32. A chip on-board processor (COP) 62 is used to regulate the four clock signals "l2_clk," "mem_clk," "proc_clk" and "xio_clk". COP 62 has three primary inputs, from "cop_ctl," "cop_sin" and "cop_clk". The output of COP 62 is provided to four shift registers 64, 66, 68, and 70, which are connected in series. Register 64 is connected to a first cache clock control circuit 72 which provides the clock signals for cache 38. Register 64 also receives a configuration input ("cfgreg_reset") from a reset logic circuit 74, which, in turn, has as its input the "por_" signal. A divider output ("div_reset") of reset logic circuit 74 is directly connected to cache clock control circuit 72. Cache clock control circuit 72 also receives an oscillating signal ("osc_out") from a reference clock selector 76. Clock selector 76 includes a logic circuit 78 connected to a buffer 80, with logic circuit 78 having three inputs providing a differential clock and a single-ended clock. Cache clock control circuit 72 uses the inputs from COP 62, register 64 and clock selector 76 to prepare the "l2_clk" signal.

Register 66 similarly receives inputs from the "cfgreg_reset" output of reset logic circuit 74 and from COP 62, with its output connected to a memory clock control circuit 82. Logic circuit 82, which also directly receives the "div_reset" output of reset logic circuit 74 and the "osc_out" signal from clock selector 76, provides the "mem_clk" signal. This signal (i.e., the output of logic circuit 82) is used as an input to another logic circuit 84 to create the "refresh_timer" signal. The "mem_clk" signal is also provided to a logic circuit 86 to create the "mem_por_" signal Register 68 also similarly receives inputs from the "cfgreg_reset" output of reset logic circuit 74 and from COP 62, with its output connected to a CPU clock control circuit 88. Logic circuit 88, which again directly receives the "div_reset" output of reset logic circuit 74 and the "osc_out" signal from clock selector 76, provides the "proc_clk" signal. This signal (i.e., the output of logic circuit 88) is used as an input to two other logic circuits 90 and 92 to create the "rst_intr_" and "hdwr_rst_" signals. The "proc_clk" and "mem_clk" signals are provided as inputs to another logic circuit 94 to create the "mem_phase" signal. The "proc_clk" is also combined with a reset signal ("topulse_divrst") from reset logic circuit 74 in another logic circuit 96 to create the "clock_rtc" and "timeout_pulse" signals.

Register 70 also similarly receives inputs from the "cfgreg_reset" output of reset logic circuit 74 and from COP 62, with its output connected to a clock control circuit 98 for the XIOs 42. Logic circuit 98, which again directly receives the "div_reset" output of reset logic circuit 74 and the "osc_out" signal from clock selector 76, provides the "xio_clk" signal. This signal (i.e., the output of logic circuit 98) is combined with the "proc_clk" signal in a logic circuit 100 to create the "io_phase" signal. The "xio_clk" signal is also combined, individually, with the signals which are input into COP 62 to create the "cop_ctl_syn," "cop_clk_syn" and "cop_sin_syn" signals, via another logic circuit 102. Another output from XIO clock control circuit 98 is fed back to COP 62, to provide a clock.

The "io_dclk" signal is provided using a buffer 104 which receives the "io_bus_osc" signal as an input.

The "cop_sout," "chkstop_" and "run_nstop" signals are provided using a buffer 106 which receives the "cop_ser_out," "checkstop_" and "run_stop_0" signals as inputs.

Figure 5:
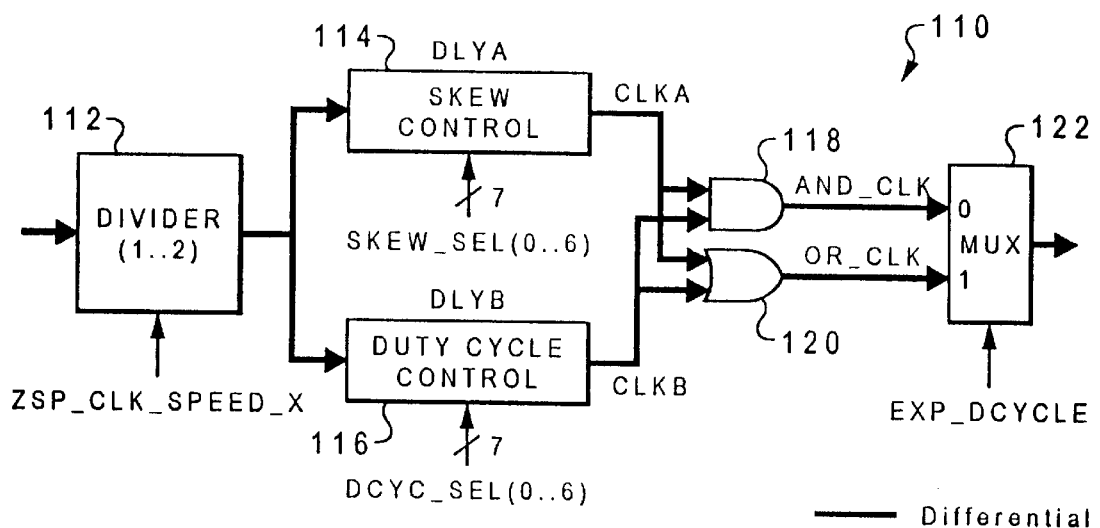
FIG. 5 is a block diagram depicting a duty-cycle control circuit for use in the clock chip of FIG. 3.

Referring now to FIG. 5, there is depicted a block diagram of a skew and duty-cycle control circuit 110 for use in clock chip 32. Duty-cycle control circuit is found in each of the clock control circuits 72, 82, 88, and 98. Duty-cycle control circuit 110 generally comprises a divider 112 which has a single clock input, and an output which is connected to both a skew controller 114 and a duty-cycle controller 116. Skew controller 114 modifies the signal from divider 112 based on the "skew_sel" signal from service processor in OCS 36, to adjust the clock edge. Duty-cycle controller 116 also modifies the signal from divider 112, based on a "dcyc_sel" signal, to adjust the clock pulse width. The outputs of skew controller 114 and duty-cycle controller 116 (signals "clock A" and "clock B") are combined in an AND gate 118 and an OR gate 120, to produce an "and_clk" signal and an "or_clk" signal. These signals are further combined in a multiplexer 122 which is controlled by an "exp_dcycle" signal generated by one of the registers 64, 66, 68, and 70. The output of multiplexer 122 is selected to accordingly shrink or expand the output pulse.

Figure 6:
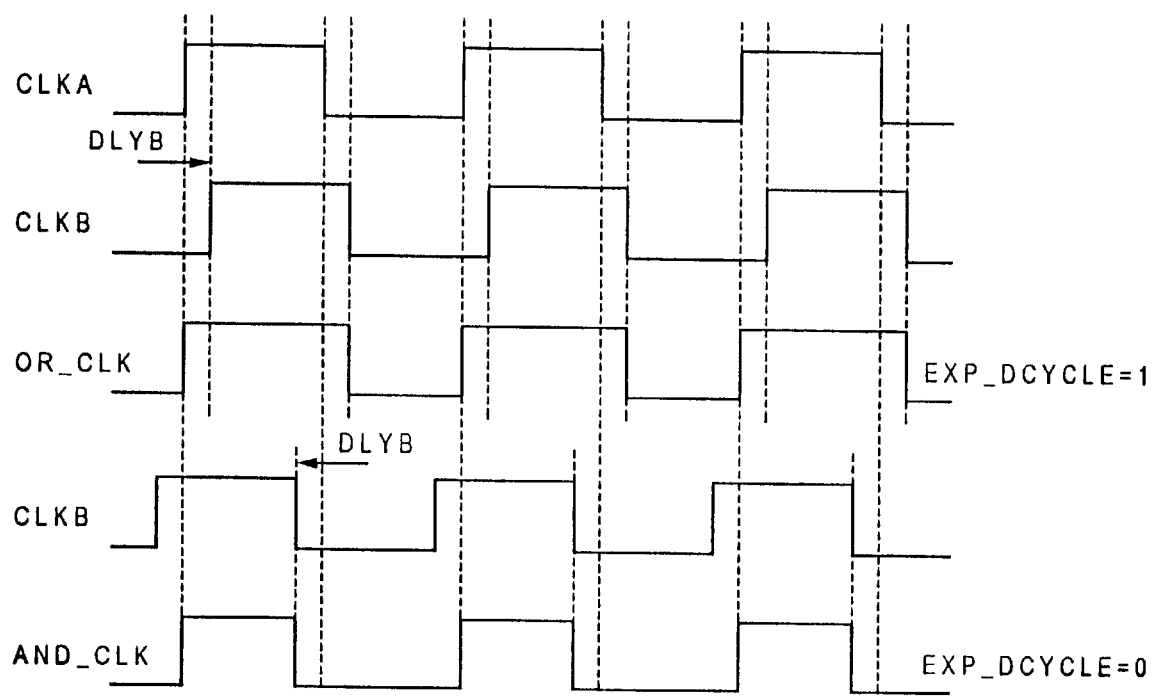
FIG. 6 is a timing diagram showing how the clock chip controls duty cycle and skew timings.

The duty-cycle control can be further understood with reference to the timing diagram of FIG. 6. The first two lines represent the clock signals A and B emanating from skew controller 114 and duty-cycle controller 116, respectively, where the clock B signal has been delayed by an amount "dlyb." The third line represents the OR combination of these two signals. The fourth line represents the clock B signal which has been advanced by the amount "dlyb, " and the fifth line represents the AND combination of this clock B signal with the clock A signal. As can be seen, the resulting output signals "or_clk" and "and_clk" are expanded and shrunk, respectively.

Figure 7:
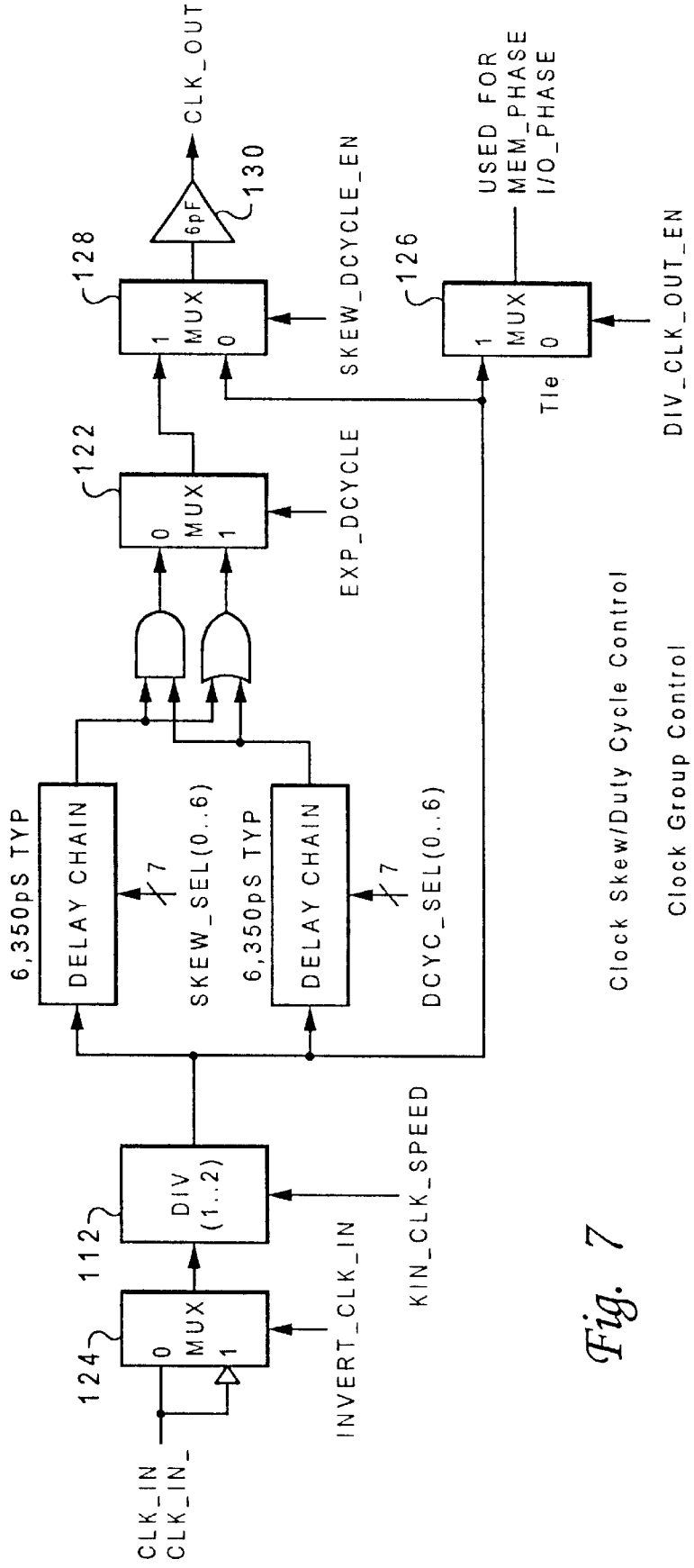
FIG. 7 shows a different view of the same control circuity of FIG. 5.

FIG. 7 reveals additional details concerning one particular implementation of the duty-cycle control circuit. The input to the circuit is provided from another multiplexer 124 which is controlled by an "invert_clk_in" signal generated by a chip input. The output of divider 112 is fed to two other multiplexers 126 and 128. A second input of multiplexer 128 receives the output of multiplexer 122. Multiplexer 122 is controlled by a signal ("exp_dcycle") generated by OCS 36. The output of multiplexer 122 is fed through a buffer 130 having an appropriate drive (e.g., 6 pF) to generate an output clock. The second input of multiplexer 126 is tied to ground (i.e., it is used only to match the delay and buffer the output signal), and its output is used to generate the "mem_phase" and "io_phase" signals.

Figure 8:
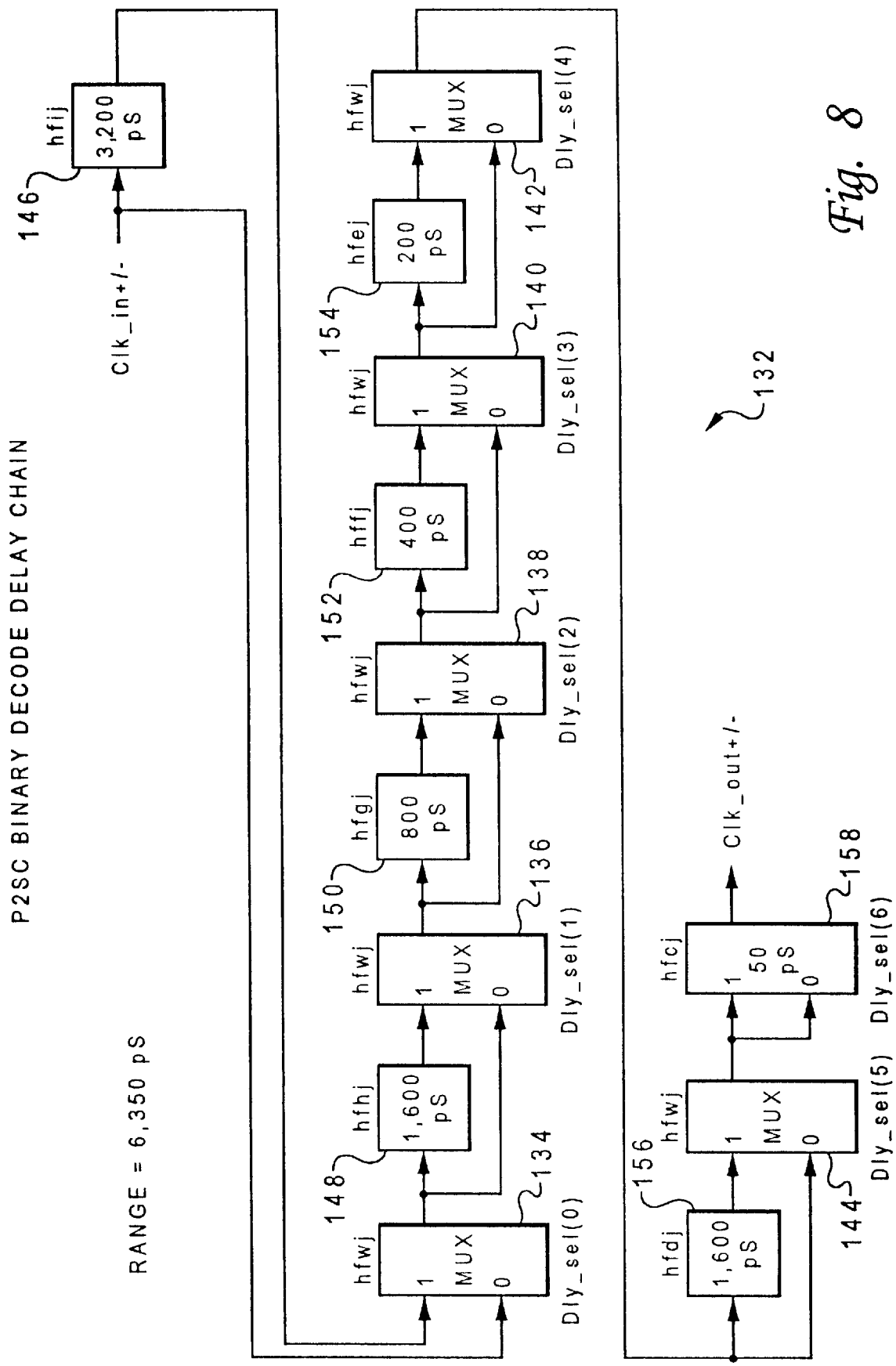
FIG. 8 is a block diagram depicting the logic of programmable delay chains in the system of FIG. 2 that receive their settings from the service processor.

FIG. 8 shows the logic of programmable delay chains that receive their settings from service processor 36. The depicted programmable delay chain 132 is used in duty-cycle controller 116, but a similar one can also be used for skew controller 114. The amount of any delay is selected using multiplexers 134, 136, 138, 140, 142, and 144, serially interspersed among a plurality of delay elements (e.g., inverter chains) 146, 148, 150, 152, 154, and 156. The amounts of delay caused by each particular delay element are preselected to provide a wide range of overall delay time which can be caused by the entire circuit, i.e., by using the various combinations of available delay elements. In this example, the lowest delay value is 50 picoseconds, with each successive delay element doubling this amount, i.e., delay element 156 has a delay constant of 100 picoseconds, delay element 154 has a delay constant of 200 picoseconds, delay element 152 has a delay constant of 400 picoseconds, delay element 150 has a delay constant of 800 picoseconds, delay element 148 has a delay constant of 1,600 picoseconds and delay element 146 has a delay constant of 3,200 picoseconds.

By using the above-described circuits, this programmable clock system is able to easily adjust the timing of the computer system by varying the individual clock pulse widths and skew (the relative timing of one clock to another clock). This capability can be used for both in-house testing and debugging, as well as being offered to the customer of the microprocessor system as part of a diagnostic package. The advanced clock system is easily tailored to optimize performance and eliminate failures due to timing defects.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A method of adjusting the timing of a computer system, comprising the steps of:
    providing a clock having a clock processor for generating output timing signals which vary based on input signals to the clock;
    setting timing parameters for the clock using a service processor which sends the input signals to the clock; and
    controlling a primary processor using the output timing signals from the clock.

2. The method of claim 1 wherein said setting step includes the step of modifying a pulse width of at least one of the output timing signals.

3. The method of claim 1 wherein said setting step includes the step of delaying a first one of the output timing signals with respect to a second one of the output timing signals.

4. The method of claim 1 wherein said controlling step includes the step of providing separate clock signals for the primary processor and for a cache connected to the primary processor.

5. The method of claim 1 wherein said controlling step includes the step of providing separate clock signals for the primary processor and for a memory of the computer system.

6. The method of claim 1 wherein said controlling step includes the step of providing separate clock signals for the primary processor and for an input/output device of the computer system.

7. The method of claim 1 wherein the clock has a duty-cycle control circuit operatively connected to the clock processor, and said setting step includes the step of programming the duty-cycle control circuit.

8. The method of claim 7 wherein the duty-cycle control circuit has at least one delay chain, the delay chain having a plurality of individually selectable delay elements, and said programming step includes the step of selecting one or more of the delay elements.

9. The method of claim 7 wherein the duty-cycle control circuit includes means for modifying a pulse width of at least one of the output timing signals, and said programming step includes the step of activating the pulse width modifying means.

10. The method of claim 8 wherein the duty-cycle control circuit further includes means for delaying a first one of the output timing signals with respect to a second one of the output timing signals, and said programming step further includes the step of activating the delaying means.

11. A clocking control circuit for a computer system, comprising:

a plurality of primary clocks providing input signals;

means for generating a plurality of output timing signals based on said primary clock input signals, said generating means including a clock processor; and a service processor having means for controlling said generating means.

12. The clocking control circuit of claim 11 wherein said primary clocks include a system oscillator, an input/output oscillator, and a real-time clock oscillator.

13. The clocking control circuit of claim 11 wherein said generating means includes means for modifying a pulse width of at least one of said output timing signals in response to a control signal from the service processor.

14. The clocking control circuit of claim 11 wherein said generating means includes means for delaying a first one of said output timing signals with respect to a second one of said output timing signals.

15. The clocking control circuit of claim 11 wherein said generating means includes a duty-cycle control circuit operatively connected to said clock processor, and having means for delaying a signal from one of the primary clock input signals.

16. The clocking control circuit of claim 15 wherein:

said duty-cycle control circuit has at least one delay chain, said delay chain having a plurality of individually selectable delay elements; and said controlling means of said service processor includes means for selecting one or more of said delay elements.

17. A computer system comprising:

a primary processor;

a clock having a clock processor for providing timing signals to said primary processor; and a service processor having means for controlling said clock to adjust said timing signals.

18. The computer system of claim 17 wherein said clock includes:

means for providing a plurality of primary clock input signals; and a duty-cycle control circuit operatively connected to said clock processor, and having means for delaying a signal from one of said primary clock input signals.

19. The computer system of claim 18 wherein said duty-cycle control circuit has at least one delay chain, said delay chain having a plurality of individually selectable delay elements; and said controlling means of said service processor includes means for selecting one or more of said delay elements.

* * * * *

UNITED STATES PATENT AND TRADEMARK OFFICE
CERTIFICATE OF CORRECTION

PATENT NO. : 5,903,747
DATED : May 11, 1999
INVENTOR(S) : Casal

It is certified that error appears in the above-identified patent and that said Letters Patent is hereby corrected as shown below:

Column 5, Line 17 delete "run_stop_O" and replace with --run_nstop_O--.

Signed and Sealed this

Eighteenth Day of January, 2000

Attest:

Attesting Officer

Q. TODD DICKINSON

Commissioner of Patents and Trademarks